(12) United States Patent
Perez et al.

(10) Patent No.: US 10,337,777 B2
(45) Date of Patent: Jul. 2, 2019

(54) CONTROLLING AIR CONDITIONING SYSTEMS

(75) Inventors: Eric Perez, Hickory Creek, TX (US); Shawn Niemann, Grand Prairie, TX (US); Der-Kai Hung, Dallas, TX (US)

(73) Assignee: Lennox Industries, Inc., Richardson, TX (US)

(*) Notice: Subject to any disclaimer, the term of this patent is extended or adjusted under 35 U.S.C. 154(b) by 739 days.

(21) Appl. No.: 13/600,763

(22) Filed: Aug. 31, 2012

(65) Prior Publication Data

US 2014/0020417 A1    Jan. 23, 2014

Related U.S. Application Data

(60) Provisional application No. 61/673,804, filed on Jul. 20, 2012.

(51) Int. Cl.
*F25B 49/02* (2006.01)
*F25B 49/00* (2006.01)
*F25B 41/06* (2006.01)

(52) U.S. Cl.
CPC .... *F25B 41/062* (2013.01); *F25B 2341/0681* (2013.01)

(58) Field of Classification Search
CPC ............ F25B 2700/2106; F25B 49/022; F25B 2600/2513; F25B 2500/31; F25B 2500/29; F25B 41/062; F25B 13/00; F24F 2011/0013; B60H 2001/325; B60H 2001/3255; B60H 2001/327; B60H 2001/3264; B60H 1/3216; Y02B 30/72; Y02B 30/741
USPC ............................................. 62/126
See application file for complete search history.

(56) References Cited

U.S. PATENT DOCUMENTS

| | | | | |
|---|---|---|---|---|
| 6,209,334 | B1* | 4/2001 | Cowans | F25B 5/02 62/224 |
| 6,968,708 | B2* | 11/2005 | Gopalnarayanan | F25B 9/008 62/186 |
| 7,337,625 | B1* | 3/2008 | Cowans | F25B 41/062 62/210 |
| 9,021,822 | B2* | 5/2015 | Unagida | F24F 11/77 62/186 |
| 2005/0257539 | A1* | 11/2005 | Lee | F24F 11/83 62/180 |
| 2010/0269521 | A1* | 10/2010 | Moore | F24F 3/1405 62/91 |
| 2011/0138830 | A1* | 6/2011 | Unagida | F24F 11/77 62/186 |
| 2011/0276185 | A1* | 11/2011 | Watanabe | F24F 3/153 700/278 |

\* cited by examiner

*Primary Examiner* — Christopher R Zerphey
*Assistant Examiner* — Meraj A Shaikh
(74) *Attorney, Agent, or Firm* — Baker Botts L.L.P.

(57) ABSTRACT

Air conditioning systems and processes may monitor properties of the system and/or properties related to the system. The air conditioning system may allow operation based on user requests and/or allow stress operation(s) based on monitored properties.

11 Claims, 4 Drawing Sheets

CONTROLLING AIR CONDITIONING SYSTEMS

CROSS-REFERENCE TO RELATED APPLICATIONS

This application claims priority to U.S. Provisional Patent Application No. 61/673,804, entitled "CONTROLLING AIR CONDITIONERS AND METERING DEVICES" filed on Jul. 20, 2012, which is incorporated by reference herein for all purposes.

TECHNICAL FIELD

The present disclosure relates to controlling air conditioning systems, and more particularly to controlling air conditioning systems during stress events.

BACKGROUND

Air conditioners often provide cold air and/or hot air to locations as desired by a user. For example, a user may request operation of an air conditioner by setting a specified ambient temperature in a location. As a result, the air conditioner may operate to achieve the specified ambient temperature. However, during air conditioning operations, the air conditioner may be subject to various stresses, which may cause mechanical failure of the air conditioner.

SUMMARY

Various systems and processes may control operations of air conditioning systems. In various implementations, a request for operation of an air conditioner may be received and a determination may be made whether to restrict operation of the air conditioner in response to the request and based at least in part on a property of the air conditioner. Stress operation(s) of the air conditioner may be allowed if operation of the air conditioner is restricted based on the determination.

Implementations may include one or more of the following features. Allowing stress operation(s) may include allowing a first stress operation that includes determining an ambient temperature proximate a portion of the air conditioner and determining if the ambient temperature is greater than a predetermined maximum temperature. High temperature operation(s) may be performed, if the ambient temperature is greater than the predetermined maximum temperature. High temperature operation(s) may include operating a blower of the air conditioner at a high stage and/or transmitting a signal to a thermal expansion valve to increase the amount of refrigerant allowed to flow through the valve. A blower of the air conditioner may include at least one high stage and one low stage. Transmitting the signal to the thermal expansion valve may include altering an automatic adjustment of the thermal expansion valve by delivering the signal to one or more heat transfer elements coupled to a bulb of the thermal expansion valve and/or allowing heat transfer between at least one of the heat transfer elements and the bulb to alter a temperature of a bulb. The signal may control heat transfer by one or more of the heat transfer elements. The amount of refrigerant allowed to pass through the thermal expansion valve may be based at least in part on the altered temperature of the bulb. Allowing one or more stress operations may include allowing a second stress operation. A second stress operation may include determining if a pressure of the refrigerant in the air conditioner is greater than a predetermined maximum pressure less than approximately ten seconds after startup of one or more compressors of the air conditioner and/or restricting operation of the compressor(s) if the pressure of the refrigerant is determined to exceed the predetermined maximum pressure. Slugging inhibition operation(s) may be performed. Slugging inhibition operation(s) may include at least one of: operating a blower of the air conditioner for one or more periods of time and/or adjusting an amount of refrigerant allowed to pass through the thermal expansion valve of the air conditioner. Allowing stress operation(s) may include allowing a third stress operation. The third stress operation(s) may include tracking a trip count that includes a number of times the pressure exceeds the predetermined maximum pressure and determining if the trip count exceeds a predetermined maximum trip count. Safe mode operation(s) may be performed if the trip count exceeds the predetermined maximum trip count. Safe mode operation(s) may include allowing a compressor of the air conditioner to operate at a low stage and/or allowing operation of one compressor and restricting operation of another compressor of an air conditioner comprising two or more compressors. The compressor may include a high stage and at least one low stage. A property of the air conditioner may includes an ambient temperature, a temperature of a refrigerant in at least a portion of the air conditioner, and/or a pressure of the refrigerant in at least a part of the air conditioner. At least two stress operations may be allowed.

In various implementations, a request for operation of an air conditioner may be received and a determination may be made whether to allow operation of the air conditioner in response to the request based at least in part on a first property of the air conditioner. An operation of the air conditioner may be restricted, if a determination is made not to allow operation of the air conditioner in response to the request. Stress operation(s) of the air conditioner may be identified to be allow based in part on at least one of the first property or a second property of the air conditioner, if operation of the air conditioner is restricted. Stress operation(s) of the air conditioner may be allowed based on the identification.

Implementations may include one or more of the following features. A first property of the air conditioner may include an ambient temperature, a temperature of a refrigerant in at least a portion of the air conditioner, and/or a pressure of the refrigerant in at least a part of the air conditioner. Stress operation(s) may include determining an ambient temperature, determining if the ambient temperature is greater than a predetermined maximum temperature, and performing high temperature operation(s) if the ambient temperature is greater than the predetermined maximum temperature. High temperature operation(s) may include operating a blower of the air conditioner at a high stage and/or transmitting a signal to a thermal expansion valve to increase the amount of refrigerant allowed to flow through the valve. The blower of the air conditioner may include at least one high stage and a low stage. A first property of the air conditioner may include the ambient temperature, and a second property of the air conditioner may include whether the blower includes at least one high stage and a low stage. The first property of the air conditioner may include the ambient temperature, and the second property of the air conditioner may include whether the thermal expansion valve is controllable. Stress operation(s) may include determining if a pressure of the refrigerant in the air conditioner is greater than a predetermined maximum pressure, restricting operation of one or more compressors of the air conditioner if the pressure is determined to exceed the predetermined maximum pressure; and performing one or more slugging inhibition operations. Slugging inhibition operation(s) may include operating a blower of the air conditioner and/or adjusting an amount of refrigerant allowed to pass through the thermal expansion valve of the air conditioner. The first property of the air conditioner may include a pressure of the refrigerant in the air conditioner, and the second property of the air conditioner may include whether the blower of the air conditioner is a multi-stage blower. The first property of the air conditioner may include the pressure of the refrigerant in the air conditioner, and the second property of the air conditioner may include whether the thermal expansion valve is adjustable. Stress operation(s) may include determining if a pressure of the refrigerant in the air conditioner exceeds a predetermined maximum pressure, tracking a trip count comprising a number of times the pressure of the refrigerant exceeds the predetermined maximum pressure; determining if the trip count exceeds a predetermined maximum trip count, and performing at least one safe mode operation if the trip count exceeds the predetermined maximum trip count. Safe mode operation(s) may include allowing a compressor of the air conditioner to operate at a low stage and/or allowing operation of one compressor and restricting operation of another compressor of an air conditioner. Compressor(s) may include a high stage and at least one low stage.

In various implementations, an air conditioner may include a memory storing a predetermined maximum property of the air conditioner and a stress operation module. The stress operation module may be operable to determine if a property of the air conditioner exceeds the predetermined maximum property of the air conditioner and allow one or more stress operations if the property of the air conditioner exceeds the predetermined maximum property of the air conditioner.

Implementations may include one or more of the following features. The air conditioner may include a thermal expansion valve, a heat transfer element coupled to the thermal expansion valve; and a processor that delivers signals to control the heat transfer element to deliver heat to a bulb of the thermal expansion valve. The air conditioner may include an opening through the thermal expansion valve is adjustable in response to the heat delivered to the bulb. The air conditioner may include a blower that includes at least one high stage and a low stage, a controllable thermal expansion valve; and a compressor having a high stage and at least one low stage. The air conditioner may include a management module that operates the air conditioner based at least in part on user requests for operation. A stress operation module may restrict operation of the air conditioner in response to user requests for operation if the property of the air conditioner exceeds the predetermined maximum property of the air conditioner.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

Figure 1:
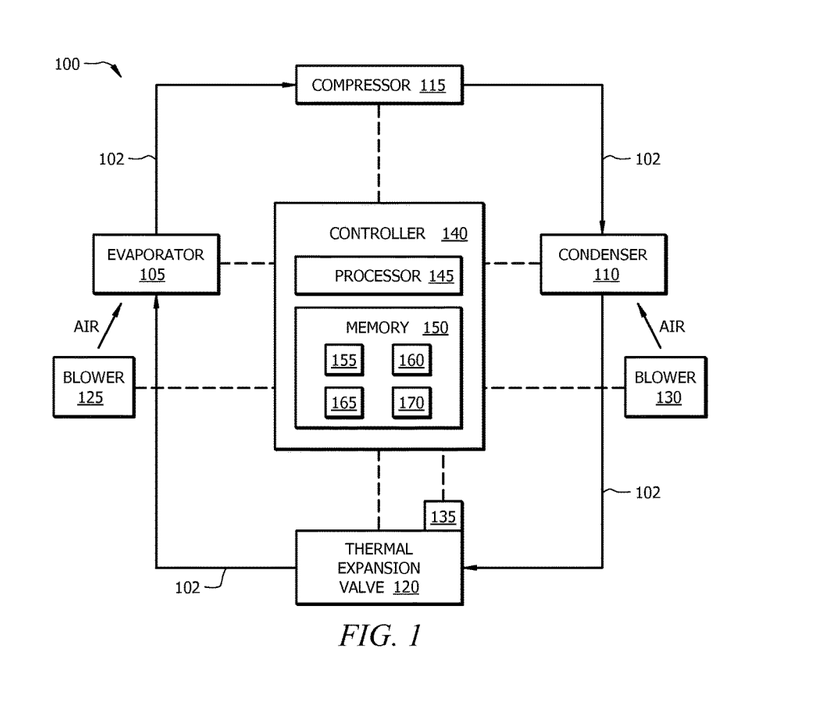
FIG. 1 schematically illustrates an implementation of an example air conditioning system.

FIG. 1 schematically illustrates an implementation of an example air conditioning system or air conditioner 100. The air conditioner 100 may include heat exchangers such as an evaporator 105 and a condenser 110. For example, the condenser 110 may be a microchannel heat exchanger, such as the microchannel heat exchanger MCHX®, commercially available from Delphi (Troy, Mich.). The air conditioner 100 may include a compressor 115, a thermal expansion valve 120, an evaporator blower 125, and a condenser blower 130. The compressor 115 may be a device that increases pressure of a gas. The thermal expansion valve 120 may include metering devices, such as valves that automatically control fluid flow through the thermal expansion valve 120 based on properties of the system. The evaporator blower 125 and/or condenser blower 130 may include various appropriate types of blowers, such as a centrifugal fan and/or crossflow fan, that create fluid flow, such as air flow. Refrigerant may flow through conduit 102 coupling various components of the air conditioning system 100. For example, a refrigerant such as R-410A may flow through conduit 102.

During operation of the air conditioner 100, the air from the evaporator blower 125 may pass at least partially through the evaporator 105 and heat may be transferred from the air to the refrigerant. The cooler air is then provided, for example via ducting, to a location such as a residential house or commercial building.

In the evaporator 105, the liquid refrigerant is at least partially evaporated into a gas by the heat transfer between the air and the refrigerant. The refrigerant may flow from the evaporator 105 to the compressor 115, which increases the pressure and/or the temperature of the refrigerant. The refrigerant then may flow from the compressor 115 to the condenser 110. In the condenser 110, air from the condenser blower 130 may remove heat from the refrigerant and the refrigerant may be liquefied. The liquefied refrigerant may pass to the thermal expansion valve 120, which automatically controls the amount of refrigerant allowed to pass through the valve 120 to the evaporator 105. For example, the thermal expansion valve 120 may include a bulb (not shown) coupled to a suction line of the evaporator 105. The temperature of the bulb may change with the temperature of the refrigerant in the suction line. In response, the thermal expansion valve 120 may automatically alter the openness of the valve 120, and thus alter the amount of refrigerant allowed to pass through the valve 120, at least partially based on the temperature of the bulb. For example, as described in U.S. patent application Ser. No. 13/600,685 entitled "CONTROLLING METERING DEVICES" to Perez et al. filed on Aug. 31, 2012, which is incorporated herein by reference, as the temperature of the bulb increases the openness of the valve may be automatically increased.

Although an operation of the air conditioning system 100 is described where cool and/or cold air is provided to a location by the evaporator 105, the cycle may be reversed such that warm and/or hot air is provided to a location by the evaporator 105. For example, heat may transfer from the refrigerant in the evaporator 105 to the air from the evaporator blower 125.

A control system including heat transfer elements 135 and/or a controller may be utilized with the thermal expansion valve 120 to alter the automatic adjustment of the thermal expansion valve 120. The heat transfer elements 135 may be coupled to a bulb of the thermal expansion valve 120 to transfer and/or remove heat from the bulb based on a signal from the controller. The thermal expansion valve 120 may then operate based on the altered temperature (e.g., the amount of refrigerant allowed to pass to the evaporator 105 may be based at least partially on the altered temperature of the bulb). The controller may be separate from, a portion of, and/or integrated with a controller 140 of the air conditioner 100.

A controller 140 may be coupled to various components of the air conditioning system 100. For example, the controller 140 may be communicably coupled to the evaporator 105, the evaporator blower 125, the compressor 115, the condenser 110, the condenser blower 130 and/or the thermal expansion valve 120. The controller 140 may be a computer, in some implementations.

The controller 140 may include a processor 145 and memory 150. Processor 145 may execute instructions and manipulate data to perform operations of the controller 140. Processor 145 may include a programmable logic device, a microprocessor, or any other appropriate device for manipulating information in a logical manner.

The memory 150 may include any appropriate form(s) of volatile and/or nonvolatile memory, such as RAM and/or Flash memory. The memory 150 may further include data 155, such as predetermined maximum operating parameters; properties to determine predetermined events, such as stress events; types of predetermined events, such as stress events; periods of time that operations should run; and/or any other data useful to the operation of the air conditioner 100. In addition, various software may be stored on the memory 150. For example, instructions 160 (e.g., operating systems and/or other types of software), an operation module 165, and a stress operation module 170 may be stored on the memory 150. The operation module 165 may operate the air conditioner 100 during normal operations (e.g., non-stress related and/or operations in which the air conditioner 100 operates based at least partially on user requests for operation). For example, the operation module 165 may receive requests for operation from a user and operate the air conditioner 100 to satisfy the user request. The stress operation module 170 may monitor properties of the air conditioning system 100, receive requests for operation of the air conditioning system 100, respond to requests for operation of the air conditioning system 100, and/or perform other operations related to operation of the air conditioner 100 during stress events. For example, the stress operation module 170 may determine and/or identify stress events, determine appropriate responses to stress events (e.g., based on properties of the components of the air conditioner 100), and/or attempt to restart normal operation of the air conditioning system 100. The stress operation module 170 may perform various stress operations.

A communication interface (not shown) may allow the controller 140 to communicate with components of the air conditioner 100 (e.g., blowers 125, 130; evaporator 105; compressor 115; condenser 110; thermal expansion valve 120; and/or heating elements 135), other repositories, and/or other computer systems. The communication interface may transmit data from the controller 140 and/or receive data from other components, other repositories, and/or other computer systems via network protocols (e.g., TCP/IP, Bluetooth, and/or Wi-Fi) and/or a bus (e.g., serial, parallel, USB, and/or FireWire). Operations of the air conditioner 100 stored in the memory 150 may be updated and/or altered through the communication via network protocols (e.g., remotely through a firmware update and/or by a device directly coupled to the controller 140).

The controller 140 may further include a presentation interface (not shown) to present data to a user, such as though a monitor and speakers. The presentation interface may facilitate receipt of requests for operation from users.

A client (not shown) may allow a user to access the controller 140 and/or instructions 160 stored on the controller 140. The client may be a computer system such as a personal computer, a laptop, a personal digital assistant, a smart phone, or any computer system appropriate for communicating with the controller 140. For example, a technician may utilize a client, such as a tablet computer, to access the controller 140. As another example, a user may utilize a client, such as a smart phone, to access the controller 140 and request operations.

Although FIG. 1 provides one example of a controller 140 that may be used with the disclosure, controller 140 can be implemented through computers such as servers, as well as a server pool. For example, controller 140 may include a general-purpose personal computer (PC) a Macintosh, a workstation, a UNIX-based computer, a server computer, or any other suitable device. According to one implementation, controller 140 may include a web server. Controller 140 may be adapted to execute any operating system including UNIX, Linux, Windows, or any other suitable operating system. The controller 140 may include software and/or hardware in any combination suitable to provide access to data and/or translate data to an appropriate compatible format.

Although FIG. 1 illustrates a single processor 145 in the controller 140, multiple processors may be used according to particular needs, and reference to processor 140 is meant to include multiple processors where appropriate.

FIG. 1 illustrates a memory 150 which may include any appropriate memory including a variety of repositories, such as, SQL databases, relational databases, object oriented databases, distributed databases, XML databases, and/or web server repositories. Furthermore, memory may include one or more forms of memory such as volatile memory (e.g., RAM) or nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), non-volatile random-access memory (NVRAM), non-volatile static random-access memory (nvSRAM), and/or phase-change memory (PRAM).

Although the air conditioner 100 is described as including components such as an evaporator 105, an evaporator blower 125, a compressor 115, a condenser 110, a condenser blower 130, a thermal expansion valve 120, and/or a heat transfer element 135, the air conditioner 100 may include one or more evaporators 105, evaporator blowers 125, compressors 115, condensers 110, condenser blowers 130, thermal expansion valves 120, and/or heat transfer elements 135. Although a thermal expansion valve 120 is described in FIG. 1, other types of metering devices may be utilized instead of or in addition to the thermal expansion valve 120, including smart valves.

In some implementations, operation modules 165 and stress operation modules 170 may be combined as a single module. Operation modules 165 and stress operation modules 170 may be distinct modules. In an implementation, operation modules 165 and/or stress operation modules 170 may include various modules and/or sub-modules.

Air conditioning systems, such as the air conditioning system 100 of FIG. 1, may have problems operating during various conditions that cause stress on the system. For example, operation of air conditioners during certain types of events (e.g., dirty coils, charging issues, operating when pressures in a portion of the air conditioner exceed maximum operation pressure, and/or operating in high ambient temperatures) may cause stress on the system. The stress on the air conditioning system may lead to a mechanical failure event of the air conditioner and/or an inability of the air conditioner to respond to requests for operation (e.g., operation of one or more components of the air conditioner may be inhibited to avoid mechanical failure). Mechanical failure events may include broken and/or worn parts, inability to respond to requests, and pre-failure events (e.g., where continued operation at conditions causing pre-failure events lead to mechanical failure). Some types of air conditioners, such as air conditioners with microchannel heat exchangers (e.g., MCHX® heat exchanger, commercially available from Delphi) may be more sensitive to stress events on the system. For example, microchannel heat exchangers may be more sensitive (e.g., more likely to have a mechanical failure event) than air conditioners without microchannel heat exchangers to high ambient temperatures (e.g., exceeding 116° F., incorrect charging, and/or pressure fluctuations).

When stress events occur, air conditioning systems may be unable to respond to requests for operation (e.g., to inhibit mechanical failure of the system, the system may be inhibited from responding and/or mechanical failure of the system may cause operations to be inhibited). When the air conditioning system fails to respond to user requests for operation, temperatures in occupied spaces (e.g., spaces in which the cooled air is directed) may become uncomfortable and/or undesirable for users. Thus, one or more stress operations may be allowed such that at least a portion of the air conditioner may operate while inhibiting mechanical failure of the air conditioning system.

Figure 2:
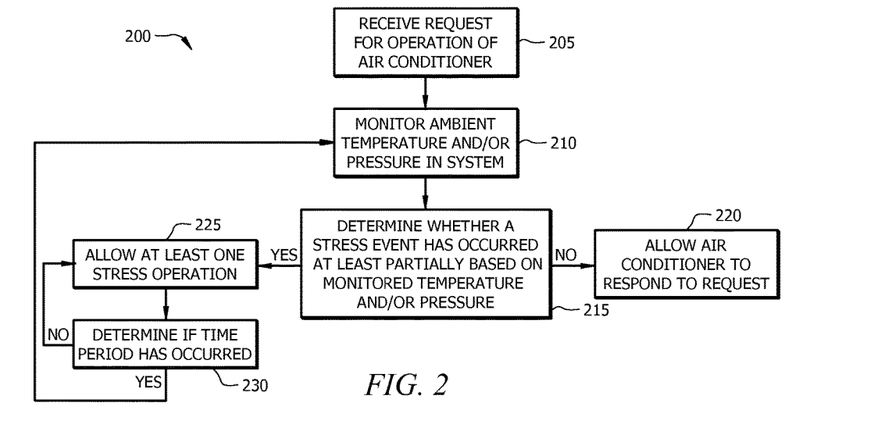
FIG. 2 illustrates an implementation of an example process for operation of an air conditioning system.

FIG. 2 illustrates an implementation of an example process 200 for operating an air conditioner, such as the air conditioner 100 of FIG. 1. An air conditioning system may receive a request for an operation (operation 205). For example, a user may input a request for the air conditioner to operate to achieve a certain temperature in a location. The user may enter the input temperature into a presentation interface, such as a liquid crystal display, of the controller of the air conditioning system.

Ambient temperature(s) and/or pressure(s) of at least a portion of the system may be monitored (operation 210). For example, a sensor may monitor ambient temperature proximate a condenser (e.g., outside a building and/or proximate an air source for the condenser blower 130) and/or deviations in temperature. A pressure of an evaporator and/or condenser may be monitored. As an example, a pressure of a microchannel condenser may be monitored due to sensitivity of the condenser (e.g., increased chance of mechanical failure when compared to other types of condensers) to high pressures.

A determination may be made regarding whether a stress event has occurred (operation 215). For example, a stress event may have properties that are measurable such as a temperature and/or pressure in a predetermined range (e.g., a stress event may include a high temperature occurrence, such as temperatures exceeding 116° F.; a pressure within a portion of the evaporator that may lead to a mechanical failure, and/or a pressure at the thermal expansion valve greater than a predetermined value). In some implementations, the monitored temperature proximate the condenser and/or pressure in a condenser may be compared to predetermined maximums to determine whether stress events (e.g., events which may lead to mechanical failure if operations continue as normal) may occur. As another example, a number of properties indicating stress events may be monitored to determine if a stress event may occur. A number of stress events may be monitored to determine if a predetermined maximum number of stress events has occurred. A predetermined maximum amount may be stored in a memory of the controller of the air conditioner.

If a determination is made (at operation 215) that a stress event has not occurred, the air conditioner may be allowed to respond to the request for operation (operation 220). For example, the air conditioner may be allowed to provide cool air to achieve a user-input parameter.

Figure 4:
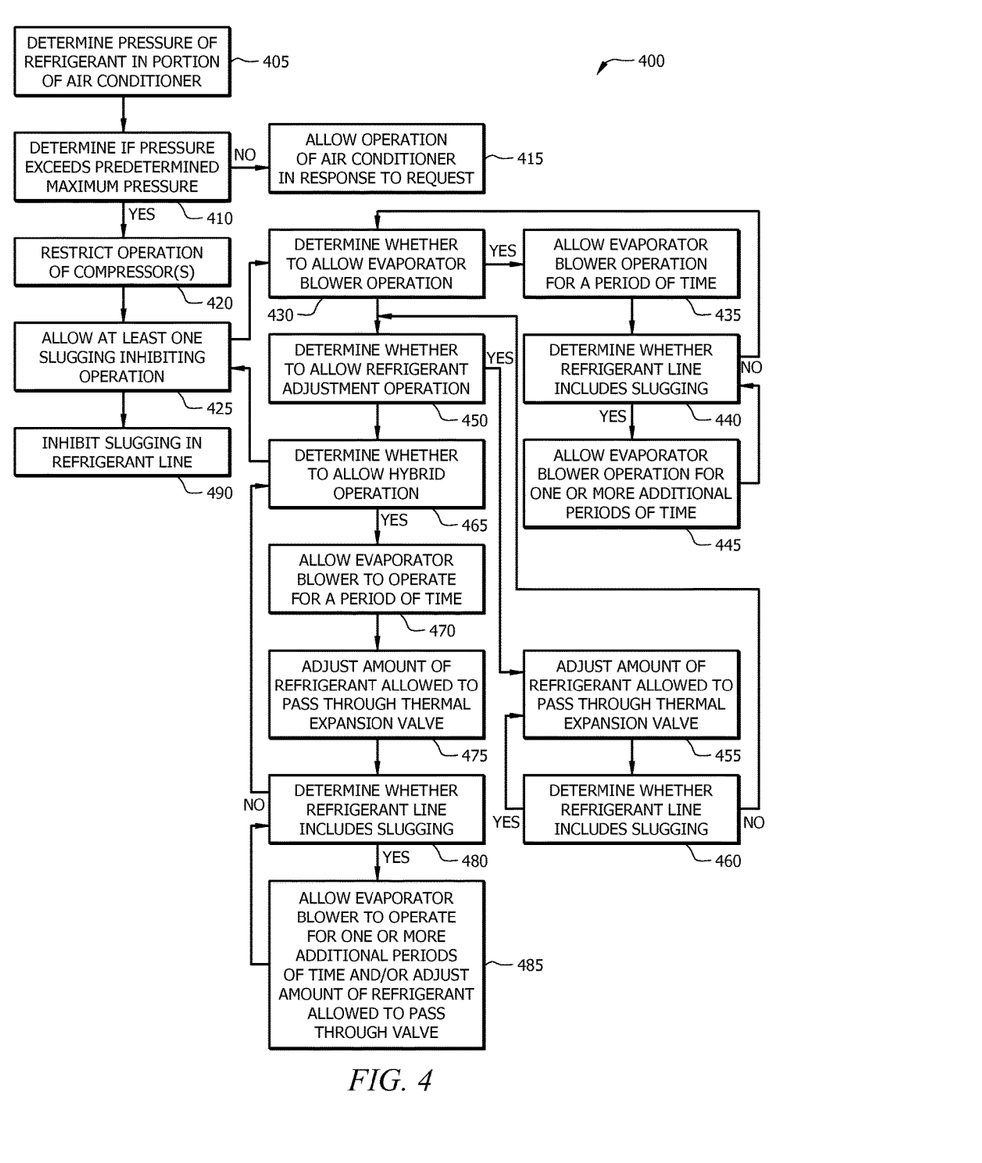
FIG. 4 illustrates an implementation of another example of a stress operation of an air conditioning system.

If a determination is made (at operation 215) that a stress event has occurred, then in some implementations, the process 200 may determine whether to allow at least one stress operation, based at least partially on the monitored ambient temperature and/or pressure of at least a portion of the system. In some implementations, if a pressure related stress event occurs less than 10 seconds after starting (e.g., initially commencing operation of) the compressor, the controller may allow a slugging inhibiting process (e.g., process 400, which is illustrated in FIG. 4).

If a determination is made to allow a stress operation, one or more stress operations may be allowed (operation 225). For example, high temperature stress operations, high-pressure stress operations, and/or safe mode operations may be performed. The stress operations may allow some function of the air conditioner while restricting other operations of the air conditioner. For example, a blower may be allowed to operate while a compressor may be restricted from operating. In some implementations, a user may receive partial operation of the air conditioner through the stress operations rather than full operation, which may cause mechanical failure of the system. Operating the air conditioner through stress operations may inhibit mechanical failure of the air conditioner at least partially based on stress events.

As illustrated in FIG. 2, a determination may be made whether a predetermined time period has occurred (operation 230). For example, a stress operation may be allowed to operate for a predetermined period of time. If the predetermined amount of time has not occurred, the stress operation may be allowed to continue (operation 225). For example, a compressor may continue to operate at a low-stage. If the predetermined amount of time has occurred, the temperature may be ambient monitored and/or pressure may be monitored (operation 210). In some implementations, an attempt to restart normal operations of the air conditioner may be allowed. The air conditioner may attempt to respond to the user request for operation of the air conditioner, in some implementations.

Process 200 may be implemented by various systems, such as system 100. In addition, various operations may be added, deleted, and/or modified. For example, properties other than and/or in addition to temperature and/or pressure may be monitored by the system. Stress events may be determined based at least partially on the monitored properties of the system. As another example, stress operations may be allowed until further servicing of the air conditioner may be performed (e.g., by a technician). The stress operations may continue until a determination is made that the property that triggered the stress operation (e.g., high ambient temperature) no longer exceeds a predetermined maximum value for the property.

Figure 3:
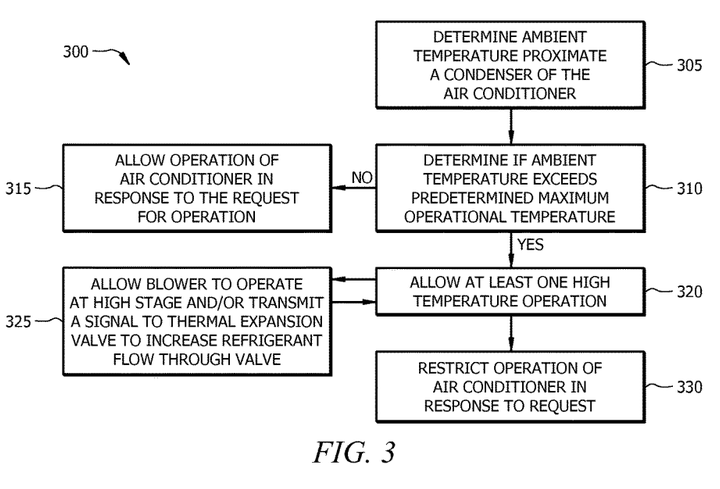
FIG. 3 illustrates an implementation of an example of a stress operation of an air conditioning system.

Stress events, such as high ambient temperatures (e.g., outside temperatures, temperatures proximate an air source of a condenser blower) may limit the operational ability of an air conditioner. For example, temperatures greater than 116° F. may cause a stress event (e.g., an event during which continued operation in response to user requests may cause mechanical failure) for the air conditioner. FIG. 3 illustrates an implementation of an example process 300, performed by an air conditioning system, for stress operations due to high ambient temperatures.

An ambient temperature proximate a condenser of the air conditioner may be determined (operation 305). For example, a sensor may measure ambient temperature and/or changes in ambient temperatures. A determination may be made whether the determined ambient temperature is greater than a predetermined maximum operational temperature (operation 310). For example, a predetermined maximum operational temperature may be stored in a memory of the controller. As another example, a controller may obtain a predetermined maximum operational temperature from a repository coupled to the controller. The predetermined maximum operational temperature may be a temperature that may cause and/or promote mechanical failure of one or more portions of the air conditioner.

If the ambient temperature is not greater than a predetermined maximum operational temperature, then the air conditioner may be allowed to operate normally (e.g., operate in response to requests for operation from users) (operation 315). For example, when a temperature does not exceed a maximum operational temperature, an air conditioner may operate at least partially based on user requests.

If a determination is made that ambient temperature is greater than a predetermined maximum temperature, at least one high temperature operation (operation 320) may be allowed. If such a high temperature operation is allowed, the controller may select one or more high temperature operations based at least partially on the properties of components of the air conditioning system. For example, a controller may allow a blower to operate at a high stage when a determination is made that an air conditioner includes a two-stage and/or multi-stage blower. The controller may allow adjustment of a thermal expansion valve automatic operation when a determination is made that the air conditioner includes a controllable thermal expansion valve. The controller may transmit signal(s) to allow the high temperature operations.

High temperature operations may be allowed, such as, allowing a blower to operate at a high stage and/or transmitting a signal to the thermal expansion valve to adjust (e.g., increase and/or decrease) a flow of refrigerant through the valve (operation 325). The blower may be a two-stage and/or multi-stage blower. The controller may determine whether an air conditioning system includes a thermal expansion valve and determine which high temperature operation to allow based on this determination. For example, if the air conditioner does not include an alterable thermal expansion valve (e.g., a thermal expansion valve with heat transfer elements or a smart thermal expansion valve that is controllable by the controller), the blower may be allowed to operate at a high stage. When a controllable thermal expansion valve is included in the system, the controller may allow the blower to operate at high speed and/or transmit a signal to the valve to increase refrigerant flow through the valve. By allowing refrigerant flow to increase to the evaporator, a mechanical failure event due to the high ambient temperatures, and the accompanying higher loads on the system, may be inhibited. Additionally, allowing the blower to operate at high speed may circulate air through the system even if heat transfer from the refrigerant is inhibited and/or limited. Allowing the blower to operate may at least partially allow the air conditioner to provide cold and/or hot air while inhibiting mechanical failure that may occur if the air conditioner responds to the user request.

If such a high temperature operation is allowed, an operation of the air conditioner may be restricted in response to a request for operation, when temperatures are determined to exceed maximum operational temperatures (operation 330). For example, an operation of a condenser and/or an evaporator may be restricted. As another example, a user may be inhibited from normally operating (e.g., inputting parameters such as temperature for the air conditioner to satisfy) the air conditioner.

Process 300 may be implemented by various air conditioning systems, such as system 100. In addition, various operations may be added, deleted, and/or modified. For example, in some implementations, an air conditioning system may only be capable of performing the high temperature operations related to blower operation. The controller may then run the blower in response to detecting high ambient temperatures. As another example, an air conditioner may have a controllable thermal expansion valve as described previously. When ambient temperatures are detected, the controller may transmit a signal to increase refrigerant flow through the valve and to the evaporator. In some implementations, high temperature operations may be performed sequentially based on preference (e.g., preference stored on a memory of the system) and/or concurrently. Process 300 may be performed in combination with other processes such as process 200 and/or alone. For example, when a high temperature operation may be performed as a stress operation based on monitored ambient temperatures.

During operation of an air conditioning system, stress events, such as high pressure events, may restrict operation of a portion of the system. In some implementations, when operation(s) of portion(s) of the system are restricted, slugging may occur. In some implementations, slugging includes migration of liquid refrigerant into vapor lines and/or components of the air conditioner (e.g., liquid in the compressor), and/or migration of vapor refrigerant into liquid lines and/or components of the air conditioner (e.g., vapor in the thermal expansion valve). Slugging may include increased levels of refrigerant in a component of the air conditioner (e.g., too much refrigerant in the compressor that leads to decreased functioning). Slugging may cause mechanical failure of one or more portions of the air conditioning system (e.g., compressing liquid may lead to premature failure of the compressor).

FIG. 4 illustrates an implementation of an example process 400 for detecting and/or inhibiting slugging in air conditioners. The process 400 may occur during startup (e.g., initiating operation) of a compressor(s). A pressure of a refrigerant in a portion of an air conditioning system may be determined (operation 405). For example, a pressure of a refrigerant in a compressor may be monitored (e.g., via sensors). The pressure of a refrigerant in an evaporator and/or condenser may be monitored (e.g., via sensors).

A determination may be made whether the determined pressure exceeds a predetermined maximum pressure (operation 410). For example, the controller may compare the determined pressure to a maximum pressure value, stored in a memory of the system. The predetermined maximum may be an operational maximum pressure for at least a portion of the air conditioner and operation of the air conditioner at pressures greater than the maximum pressure may at least partially cause mechanical failure of at least a portion of the air conditioning system.

If the determined pressure does not exceed the maximum pressure, the air conditioner may be allowed to respond to requests for operation (operation 415). For example, if the pressure in the compressor does not exceed a maximum operational pressure, a user may control the air conditioning system (e.g., a user may input operation requests and the air conditioner may operate in response to the requests).

If a determination is made that the pressure does exceed a predetermined maximum pressure, an operation of the compressor may be restricted (operation 420). In some implementations, a slugging event may occur when the discharge pressure exceeds a predetermined maximum pressure less than approximately 10 seconds after start of the compressor(s). When the pressure of a portion of the system exceeds a predetermined maximum for the portion, a user's control of the system may be restricted and the controller may perform stress operations, such as slugging inhibiting operations.

At least one slugging inhibition operation may be allowed (operation 425). When a compressor operation is restricted, slugging may continue to occur without at least one slugging inhibition operation being performed. The controller may identify the location where slugging may occur (e.g., based on which component operation is restricted) and determine which slugging operation(s) to allow.

Slugging operations may include various operations, such as evaporator blower operations, refrigerant adjustment operations, and/or hybrid operations. A determination may be made whether to allow evaporator blower operations (operation 430). For example, the controller may determine whether to allow evaporator blower operations based at least in part on the included types of components in the air conditioning system. For example, if an air conditioner does not include a controllable thermal expansion valve, the controller may allow evaporator blower operations. As another example, the controller may determine whether to allow evaporator blower operations based at least in part on whether other slugging inhibiting operations have inhibited slugging.

The evaporator blower may be allowed operate for a period of time (operation 435). For example, the controller may transmit a signal to the evaporator blower to operate for a predetermined period of time, such as 10 minutes. The controller may access a memory of the controller to determine the predetermined period of time to operate the evaporator blower. A determination may be made whether at least a portion of the refrigerant line includes slugging (operation 440). For example, an air conditioner may be inhibited from normal operations when slugging is present in refrigerant lines. A controller may determine whether slugging is present by attempting to restart normal operations (e.g., operate the air conditioner in response to user requests and/or using predetermined start-up parameters).

If a determination is made that the refrigerant line does not include slugging, slugging in the air conditioner may have been inhibited by allowing operation of the slugging inhibiting operations. If a determination is made that the refrigerant line does include slugging, the evaporator blower may be allowed to operate for one or more additional periods of time (operation 445). The additional period of time may and/or may not equal the amount of time that the evaporator blower operated initially. A controller may continue to run the blower until slugging is inhibited in the refrigerant line, in some implementations.

A determination may be made whether to allow refrigerant adjustment operations (operation 450). For example, the determination may be made based on whether other slugging inhibiting operations inhibited slugging and/or based on components included in the air conditioning system.

When a determination is made to allow refrigerant adjustment operations, an amount of refrigerant allowed to pass through the thermal expansion valve is adjusted (operation 455). The automatic adjustment of the thermal expansion valve may be inhibited and/or altered by the heat transfer elements and/or controller of the air conditioner. For example, the controller transmits a signal to heat transfer elements coupled to a bulb of a thermal expansion valve such that the temperature of the bulb is altered and the openness of the thermal expansion valve is adjusted based on the altered bulb temperature. As another example, a controller transmits a signal to a controllable thermal expansion valve to alter the openness of the valve.

A determination may be made whether at least a portion of the refrigerant line includes slugging (operation 460). For example, a determination may be made whether a component and/or conduit coupling components includes slugging. A controller may determine whether slugging has occurred in the air conditioner by attempting to restart normal operations of the air conditioner. If slugging is present in at least a portion of the air conditioner, then the amount of refrigerant may be additionally adjusted. For example, the controller may transmit a signal to a heat transfer element to additionally adjust the temperature of the bulb and the openness of the thermal expansion valve may be altered based on the additional adjustment of bulb temperature. If slugging has been inhibited, normal operations may be restarted.

A determination may be made whether to allow hybrid operations (operation 465). For example, a controller may determine whether to allow hybrid operations based at least in part on components included in the system and/or whether other slugging operations have inhibited slugging.

If hybrid operations are allowed, an evaporator blower may be allowed to operate for a period of time (operation 470). For example, the controller may transmit a signal to the evaporator blower to operate for 15 minutes. An amount of refrigerant allowed to pass through the thermal control valve may be adjusted (operation 475). For example, if an air conditioning system includes a controllable thermal expansion valve, a controller may transmit a signal to the thermal expansion valve to adjust an openness of the valve.

A determination may be made whether slugging is present in at least a portion of the refrigerant line (operation 480). For example, if slugging is present in one or more of the components of the air conditioning system and/or in lines coupling components, then slugging may be present in at least a portion of the refrigerant line. In some implementations, if the compressor(s) of the air conditioning system may be restarted to normal operations, slugging may have been inhibited.

If slugging has been inhibited by the hybrid operation, then normal operations of the air conditioner may be restarted. If slugging has not been inhibited by the hybrid operation, the evaporator blower may be operated for one or more additional periods of time and/or an amount of refrigerant allowed to pass through the thermal expansion valve may be adjusted (operation 485). The additional amount of time may be approximately the same or different from the period of time that the evaporator blower operated initially. A controller may determine whether to allow the blower to operate for an additional period of time and/or allow additional adjustment of the amount refrigerant allowed to pass through the valve. In some implementations, the controller may allow one slugging inhibiting operation (e.g., operating the blower) while restricting another slugging inhibiting operation.

A determination may be made again regarding whether slugging is present in the refrigerant line (operation 480) and additional slugging inhibiting operation(s) (operation 485) may be allowed if slugging is present. If slugging is not present in the refrigerant line, slugging may have been inhibited (operation 490).

Process 400 may be implemented by various systems, such as system 100. In addition, various operations may be added, deleted, and/or modified. For example, operation of another component of the system may be restricted in addition to and/or instead of restricting operation of the condenser. One or more slugging inhibiting operations may be restricted based on components of the air conditioning system. For example, if an air conditioner does not include a controllable thermal expansion valve, slugging operations based on adjusting a refrigerant flow through the valve may be restricted and/or inhibited by the controller.

In some implementations, slugging inhibiting operations may be performed sequentially, sequentially based on preference (e.g., a preference stored on a memory of the system) and/or concurrently. Process 400 may be performed in combination with other processes such as process 200 and/or process 300. Process 400 may be performed alone. For example, a slugging inhibiting operation may be performed as a stress operation based on monitored pressures. If monitored pressures exceed a predetermined pressure within a short predetermined period of time (e.g., less than approximately 10 seconds) of the initiation of operations of the compressor(s), slugging inhibiting operations may be performed.

Stress events may include operating air conditioners with multiple high pressure events (e.g., repeated pressures exceeding a maximum operating pressure in the same and/or different components of the air conditioner). In some implementations, a safe mode operation may be allowed such that at least partial operation of the air conditioner may be allowed. For example, if a user requests air conditioner operation and the air conditioner has multiple high pressure events and safe mode operations are restricted, operation of the air conditioner may be restricted and/or the user may not have cool air in the location desired. Allowing safe mode operations may allow at least a portion of the air conditioner function in response to a request for operation while inhibiting mechanical failure associated with normal operation during high pressure events and/or multiple high pressure events.

Figure 5:
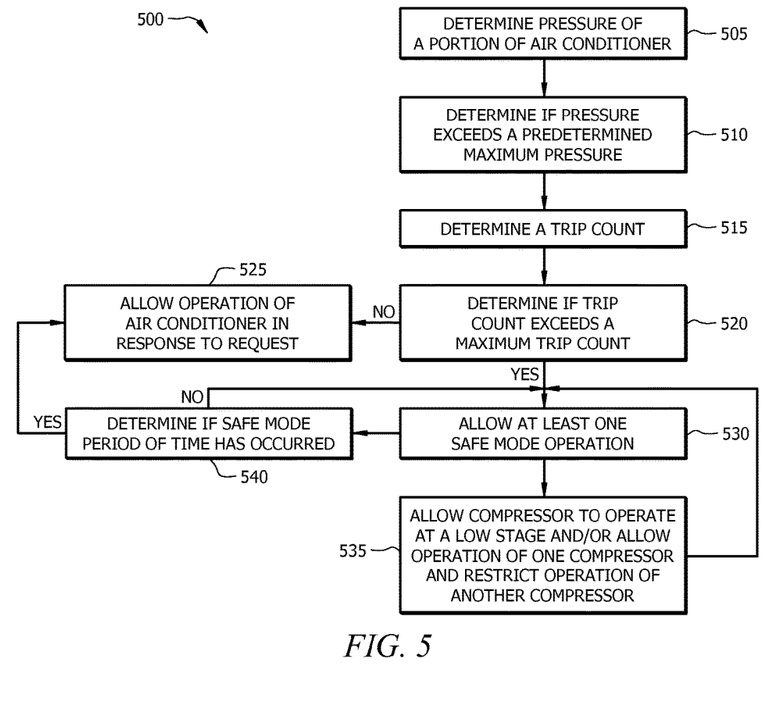
FIG. 5 illustrates an implementation of a further example of a stress operation of an air conditioning system.

FIG. 5 illustrates an implementation of an example process 500 for safe mode operations of an air conditioner. A pressure of at least a portion of an air conditioning system may be determined (operation 505). For example, a sensor coupled to the compressor may monitor pressure and/or a sensor coupled to the condenser may monitor pressure. A difference in pressure may be monitored, in some implementations.

A determination may be made whether a determined pressure exceeds a predetermined maximum pressure (operation 510). For example, a controller may compare a monitored pressure to a maximum operational pressure to determine if the pressure exceeds a maximum pressure. The maximum operational pressure may be stored in a memory of the controller. A trip count may be determined (operation 515). For example, a number of times a determined pressure exceeds a predetermined maximum pressure during a predetermined time frame may be monitored. The controller may count the number of times a pressure exceeds a predetermined maximum pressure. Trip count(s) may be based on a portion of the system and/or the whole system, in some implementations.

A determination may be made whether the value of the trip count exceeds a predetermined maximum trip count value (operation 520). For example, a controller may compare the value of the trip count to a predetermined maximum number of trips, stored in a memory of the controller. If the value of the trip count does not exceed the predetermined maximum trip count value, operation of the air conditioning system in response to a request may be allowed (operation 525).

If the value of a trip count does exceed a predetermined maximum trip count value, then at least one safe mode operation may be allowed (operation 530). For example, the controller may determine that the maximum trip count has been exceeded and selects a safe mode operation. The controller may select one or more safe mode operations based on properties of the air conditioning system, such as whether a compressor has two stages and/or whether a system has more than one compressor.

Safe mode operations may include allowing a compressor to operate at a low stage and/or allowing operation of one compressor and restricting operation of another compressor (operation 535). For example, in a system with a two-stage and/or a multi-stage compressor, a compressor may be allowed to operate in a low stage. In a system with more than one compressor, operation of at least one compressor may be allowed and operation of at least one compressor may be restricted. The compressor allowed to operate may be operated at a low-stage, high-stage, and/or at a single stage, for single stage compressors. In some implementations, one compressor is allowed to operate at a low stage while another compressor is restricted. A user may have at least a partial amount of cool air, when compared with normal operations, at a desired location when the compressor operates at the low-stage. Since the air conditioning system under high pressure stress events may inhibit normal operations without the safe mode operations, the reduced operations under safe mode may be appreciated by the user.

A determination may be made whether a safe mode period of time has occurred (operation 540). A controller may measure the amount of time that the safe mode has operated and compare the time to the safe mode period of time. The safe mode period of time may be a predetermined time period stored in a memory of the system. If the safe mode period of time has not occurred, at least one safe mode operation may be continued (operation 520). For example, if the safe mode period of time is 15 minutes, and the compressor has not been allowed to run at a low stage for 15 minutes, the safe mode operation may be allowed to continue by the controller. If the safe mode period of time has occurred, operation of the air conditioner in response to requests by the user may be allowed (operation 525). For example, after 15 minutes of safe mode operation(s), the air conditioner may attempt to restart normal operations.

Process 500 may be implemented by various systems, such as system 100. In addition, various operations may be added, deleted, and/or modified. For example, only one safe mode operation may be allowed in a single two-stage compressor air conditioning system. As another example, other stress operations may be allowed. In some implementations, if the attempt to restart the air conditioner does not work (e.g., a high pressure event occurs, restarting is not possible, etc.), one or more safe mode operations may be allowed.

Although high pressure events have been described as monitored and safe mode operations initiated based on the high pressure events, other stress events may be monitored (e.g., high ambient temperatures) and appropriate safe mode operations may be initiated based on the stress event(s).

In some implementations, safe mode operations may be performed sequentially based on preference (e.g., preference stored on a memory of the system) and/or concurrently. Process 500 may be performed in combination with other processes such as process 200, process 300, and/or process 400. Process 500 may be performed alone. For example, a safe mode operation may be performed as a stress operation based on monitored pressures.

As illustrated in FIGS. 1-5. An air conditioning system 100 as described in FIG. 1 can perform the operations of FIGS. 2-5 concurrently and/or independently. For example, an air conditioner with a controllable thermal expansion valve may perform stress operations, as described in FIG. 2, such as: high temperature operations, as described in FIG. 3; slugging inhibiting operations, as described in FIG. 4; and/or safe mode operations, as described in FIG. 5. In some implementations, the controller may automatically select which stress operation is appropriate based on system properties and/or components.

In some implementations, stress events may be performed individually and/or in combination with each other. For example, an air conditioner may only be allowed to perform one stress operation and/or part of a stress operation, such as running a blower at a high stage when ambient temperatures are high. As another example, an air conditioner may perform stress operations for high pressures and/or stress operations related to repeat high pressures.

Although users have been described as human, a user may be a person, a group of people, a person or persons interacting with one or more computers, and/or a computer system. Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackpad) by which the user can provide input to the computer. Other kinds of devices can be used to provide for interaction with a user as well; for example, feedback provided to the user by an output device can be any form of sensory feedback (e.g., visual feedback, auditory feedback, or tactile feedback); and input from the user can be received in any form, including acoustic, speech, or tactile input.

The computing system may include clients and servers. A client and server are generally remote from each other and typically interact through a communication network. The relationship of client and server arises by virtue of computer programs running on the respective computers and having a client-server relationship to each other.

Although a specific implementation of the system is described above, various components may be added, deleted, and/or modified. In addition, the various times and/or temperatures are described for exemplary purposes. Times and/or temperatures may vary, as appropriate. Although air conditioning systems have been described as providing cool air to a location for a user, the various described systems and processes may be performed with air conditioning systems providing heat to a location for a user. In some implementations, one or more of the processes described in FIGS. 2-5 may be performed concurrently. In some implementations, selection of the processes performed by the air conditioner may be determined by the controller and/or instructions stored in a memory of the controller. For example, a manufacturer may provide instructions to control stress operations. The instructions may be updated to allow, restrict, and/or allow additional stress operations (e.g., updated via instructions received over a network and/or from a computing device and/or memory device directly coupled to the air conditioner). Although mechanical failure and mechanical failure events have been described as conditions that cause mechanical failure, conditions that precede mechanical failure may also be included, such as excessive wear on parts.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a stress operation" includes a combination of two or more stress operations and reference to "a slugging inhibiting operation" includes different types and/or combinations of slugging inhibiting operations. Reference to "a compressor" may include a combination of two or more compressors. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An HVAC system comprising:
a controller;
an evaporator;
a condenser:
one or more compressors;
a plurality of sensors, including at least one pressure sensor, the plurality of sensors capable of detecting a stress event, the stress event comprising operating a portion of the HVAC system with a refrigerant pressure above a predetermined pressure value for the portion of the HVAC system; and
a stress module communicatively coupled to the plurality of sensors and to the controller;
wherein the stress module is operable, in response to the controller receiving a request for an operation of the HVAC system, to:
determine whether to allow the operation based at least in part on detecting the stress event;
restrict the requested operation if the stress module determines to not allow the operation;
identify at least one stress operation to allow based in part on a measured pressure at the at least one pressure sensor exceeding the predetermined pressure value for the portion of the HVAC system, if the operation is restricted; and
allow at least one stress operation based on the identification, wherein the at least one stress operation comprises adjusting a refrigerant flow rate;
wherein:
the identification of one or more stress operations to allow by the stress module is further based on tracking a trip count comprising a number of times the measured pressure exceeds the threshold and whether the trip count exceeds a predetermined trip count; and
the at least one stress operation further comprises performing at least one safe mode operation if the trip count exceeds the predetermined trip count, wherein the at least one safe mode operation comprises at least one of:
allowing a respective compressor of the one or more compressors to operate at a low stage, wherein the respective compressor comprises a high stage and at least one low stage; or
allowing operation of one compressor of the one or more compressors and restricting operation of another compressor of the one or more compressors.

2. The HVAC system of claim 1, further comprising:
a thermal expansion valve;
a heat transfer element coupled to the thermal expansion valve; and
a processor that delivers signals to control the heat transfer element to deliver heat to a bulb of the thermal expansion valve;
wherein an opening through the thermal expansion valve is adjustable in response to the heat delivered to the bulb.

3. The HVAC system of claim 1, further comprising at least one of:
a blower having at least one high stage and a low stage; or
a controllable thermal expansion valve.

4. The HVAC system of claim 1, wherein the at least one stress operation further comprises adjusting a blower operation.

5. The HVAC system of claim 1, wherein:
the identification of one or more stress operations to allow by the stress module is further based in part on a measured ambient temperature exceeding a predetermined temperature; and
the at least one stress operation further comprises operating a blower of the HVAC system at a high stage, wherein the blower of the air HVAC system comprises at least one high stage and one low stage.

6. The HVAC system of claim 1, wherein:
the identification of one or more stress operations to allow by the stress module is further based on a measured pressure of the refrigerant at the at least one pressure sensor exceeding the predetermined pressure less than approximately ten seconds after startup of one or more compressors of the HVAC system; and
the at least one stress operation further comprises:
restricting operation of one or more of the one or more compressors if the pressure of the refrigerant is determined to exceed the predetermined pressure; and
performing one or more slugging inhibition operations, wherein the one or more slugging inhibition operations comprise at least one of: operating a blower of the HVAC system for one or more periods of time or adjusting an amount of refrigerant allowed to pass through a thermal expansion valve of the HVAC system.

7. An HVAC system comprising:
a controller;
an evaporator;
a condenser;
a thermal expansion valve;
a blower;
one or more compressors;
a plurality of sensors, including at least one pressure sensor, the plurality of sensors capable of detecting a stress event, the stress event comprising operating a portion of the HVAC system with a refrigerant pressure above a predetermined pressure value for the portion of the HVAC system; and
a stress module communicatively coupled to the plurality of sensors and to the controller;
wherein the stress module is operable, in response to the controller receiving a request for an operation of the HVAC system, to:
determine whether to allow the operation based at least in part on detecting the stress event;
restrict the requested operation if the stress module determines to not allow the operation;
identify at least one stress operation to allow based in part on a measured pressure at the at least one pressure sensor exceeding the predetermined pressure value for the portion of the HVAC system, if the operation is restricted; and allow at least one stress operation based on the identification, wherein the at least one stress operation comprises adjusting a refrigerant flow rate; and wherein:

the identification of one or more stress operations to allow by the stress module is further based on a measured pressure of the refrigerant at the at least one pressure sensor exceeding the predetermined pressure less than approximately ten seconds after startup of one or more compressors of the HVAC system; and the at least one stress operation further comprises:

restricting operation of one or more of the one or more compressors if the pressure of the refrigerant is determined to exceed the predetermined pressure; and performing one or more slugging inhibition operations, wherein the one or more slugging inhibition operations comprise at least one of: operating the blower for one or more periods of time or adjusting an amount of refrigerant allowed to pass through the thermal expansion valve.

8. The HVAC system of claim 7, further comprising:

a heat transfer element coupled to the thermal expansion valve; and a processor that delivers signals to control the heat transfer element to deliver heat to a bulb of the thermal expansion valve;

wherein an opening through the thermal expansion valve is adjustable in response to the heat delivered to the bulb.

9. The HVAC system of claim 7, further comprising at least one of:

a blower having at least one high stage and a low stage; or a compressor having a high stage and at least one low stage.

10. The HVAC system of claim 7, wherein the at least one stress operation further comprises adjusting a blower operation.

11. The HVAC system of claim 7, wherein:

the identification of one or more stress operations to allow by the stress module is further based in part on a measured ambient temperature exceeding a predetermined temperature; and the at least one stress operation further comprises operating the blower at a high stage, wherein the blower comprises at least one high stage and one low stage.

* * * * *

UNITED STATES PATENT AND TRADEMARK OFFICE
CERTIFICATE OF CORRECTION

PATENT NO. : 10,337,777 B2
APPLICATION NO. : 13/600763
DATED : July 2, 2019
INVENTOR(S) : Eric Perez et al.

It is certified that error appears in the above-identified patent and that said Letters Patent is hereby corrected as shown below:

In the Claims

In Column 18, Line 22, please delete, "wherein the blower of the air HVAC..." and insert -- wherein the blower of the HVAC... --, therefor.

Signed and Sealed this
Third Day of May, 2022

Katherine Kelly Vidal
Director of the United States Patent and Trademark Office